United States Patent [19]

Smith et al.

[11] 4,426,754
[45] Jan. 24, 1984

[54] CLAMP FOR MULTIPLE ELECTRICAL CABLES

[75] Inventors: David W. Smith, Alexandria, Va.; Francis M. Gagnon, Waldorf, Md.

[73] Assignee: Caci, Inc. - Federal, Arlington, Va.

[21] Appl. No.: 324,539

[22] Filed: Nov. 24, 1981

[51] Int. Cl.³ .......................... F16L 3/00; B65D 63/00
[52] U.S. Cl. ...................................... 24/17 AP; 24/22; 24/115 R
[58] Field of Search .................. 24/17 AP, 20 R, 21, 24/22, 243 K, 255 BS, 256, 257, 115 R; 248/62, 74.4

[56] References Cited

U.S. PATENT DOCUMENTS

| 241,453 | 5/1881 | Untermeyer | 24/22 X |
|---|---|---|---|
| 583,454 | 6/1897 | Burns | 24/22 |
| 1,028,937 | 6/1912 | Free | 24/22 |
| 1,290,974 | 1/1919 | Gragg | 24/22 |
| 1,808,059 | 6/1931 | Mortenson | 24/21 |
| 4,312,101 | 1/1982 | Oetiker | 24/20 R |

FOREIGN PATENT DOCUMENTS

| 1270366 | 7/1961 | France | 24/243 K |
|---|---|---|---|
| 758160 | 10/1956 | United Kingdom | 248/74.1 |

*Primary Examiner*—Robert P. Swiatek
*Attorney, Agent, or Firm*—Edmund M. Jaskiewicz

[57] ABSTRACT

A clamp for multiple electrical cables has a band of a hard but resilient plastic material which encloses a number of electrical cables and the ends of the band are connected by a one-piece locking member. The ends of the band each have spaced lateral flanges thereon to define a transverse slot therebetween and the locking member is received within the slots such that when the ends of the band are drawn together end portions of the locking member are closely received under the flanges to secure the lamp tightly around the cables.

8 Claims, 6 Drawing Figures

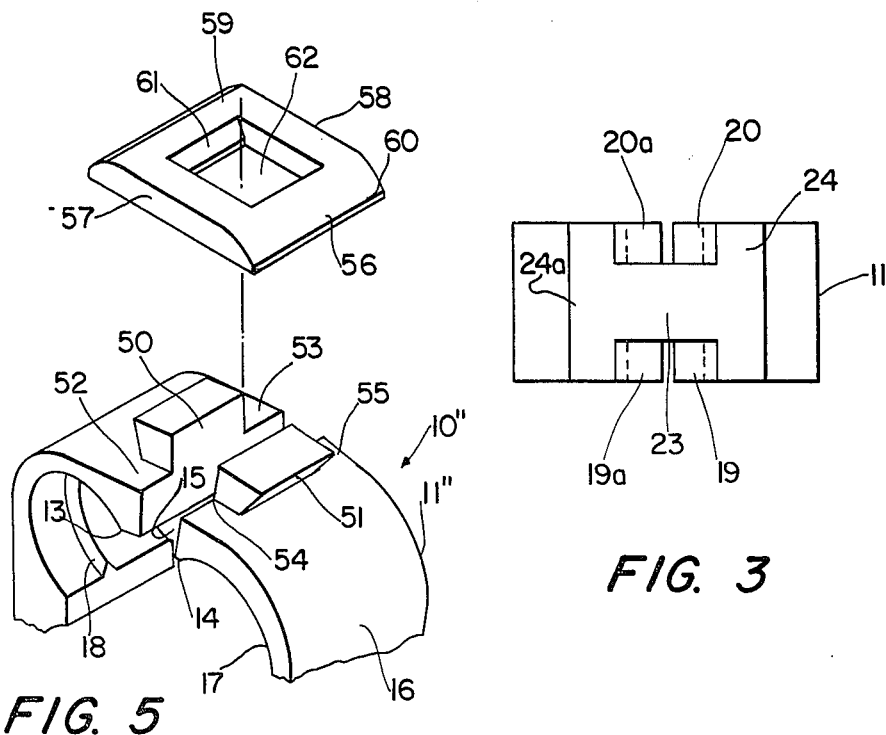
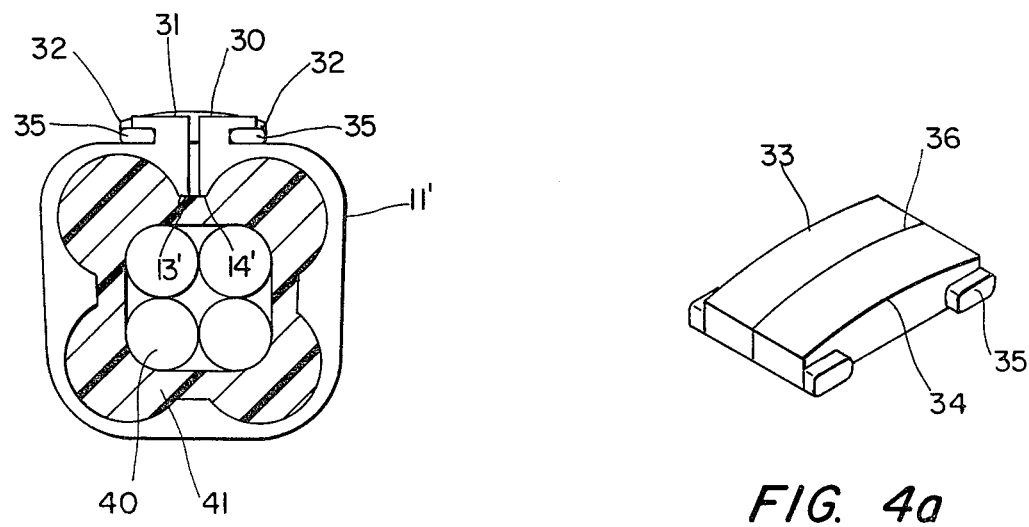

CLAMP FOR MULTIPLE ELECTRICAL CABLES

The present invention relates to a clamp for multiple electrical cables and the like, more particularly, to such a clamp having a band enclosing a number of electrical cables and the ends of the clamp are secured by a locking member.

In many applications involving electrical power, more than one electrical cable may be used to conduct electricity of varying voltages from a source to a point of application. An example of such an application is an aircraft flight line wherein electricity under different voltages and sometimes frequencies is necessary for the proper servicing of aircraft. This means that two and sometimes as many as six electrical cables lead from a source of electrical power such as a service island to an aircraft. Where each service island on an aircraft flight line may be used to service as many as four different aircraft it is readily apparent that there will be a confusion of different electrical cables leading from a service island. While it is relatively a simple matter to secure or bind in some other manner a number of cables leading from a service island to a single aircraft such connections are generally temporary in that they usually involve electrical tapes or other materials which wear rapidly under the rough handling conditions generally present under such circumstances.

Various forms of clamps are known for use in enclosing a number of electrical cables. However, such clamps are generally of a metal construction and are of a complicated and cumbersome construction so as to preclude their use on an aircraft flight line. Further, such known clamps are generally intended for a permanent or stationary location and thus are of a considerable size and weight. Since the bundles of electrical cables are being constantly handled it is extremely desirable that any clamping structure used for enclosing bundles of cables be extremely light, strong, durable and capable of being easily and readily secured in position.

It is apparent that the use of non-metallic materials would be extremely desirable in the securing of electrical cables so as to minimize any danger from sparks.

Many forms of clamps are also known for use in clamping hoses, cables, pipes and other forms of elongated structures. However, such clamps are generally not adapted for clamping a number of electrical cables together under the circumstances generally encountered on an aircraft flight line and such clamps are either too cumbersome in structure or too complicated in operation.

It is therefore the principal object of the present invention to provide a novel and improved clamp for multiple electrical cables and the like.

It is another object of the present invention to provide a clamp for multiple electrical cables and the like which is simple in construction yet securely clamps the cables enclosed therein.

It is a further object of the present invention to provide a clamp for multiple electrical cables and the like which may be constructed of a metallic or non-metallic material in which includes a readily attachable and removable locking member for securing the clamp around the cable.

It is an additional object of the present invention to provide a clamp disclosed herein which is light in weight but effectively retains a number of cables together after being clamped in position.

According to one aspect of the present invention, a clamp for multiple electrical cables and the like may comprise a band of hard but resilient material shaped to enclose a number of cables. The ends of the band are spaced to define a gap therebetween such that the ends are adapted to be drawn together. There are aligned lateral flange means on each of the band ends. The length of a flange means in the axial direction of the band is less than the width of the band so as to define at least one space on a band end adjoining a lateral flange means. The spaces on the bank ends are aligned. The locking member has a body portion which is seatable in the aligned spaces and further has a transverse portion at each end thereof receivable under the flanges when the band ends are drawn together to secure the clamp around the cables enclosed therein.

Other objects and advantages of the present invention will be apparent upon reference to the accompanying description when taken in conjunction with the following drawings, which are exemplary, wherein:

FIG. 3 is a top plan view of the clamp shown in FIG. 2;

FIG. 4 is a front elevational view of a modification of the clamp according to the present invention;

FIG. 4a is a perspective view of the locking member for the modification of FIG. 4; and FIG. 5 is a perspective view similar to that of FIG. 1 but illustrating a further modification of the clamp.

Proceeding next to the drawings wherein like reference symbols indicate the same parts throughout the various views a specific embodiment and modification of the present invention will be described in detail.

Figure 1:
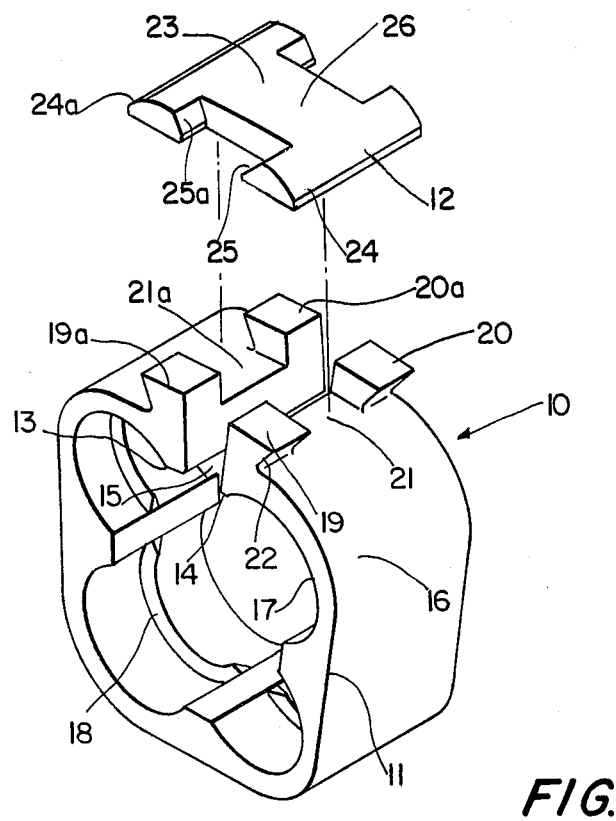
FIG. 1 is an overall perspective view of the clamp according to the present invention with the band and locking member being shown in exploded relationship.

A clamp according to the present invention is indicated generally at 10 in FIG. 1 and comprises a band 11 and a locking member 12. The band 11 is made of a hard but resilient material which may be a plastic such as 801 Teflon (DuPont) or of metal but preferably of a non-metallic material.

Figure 2:
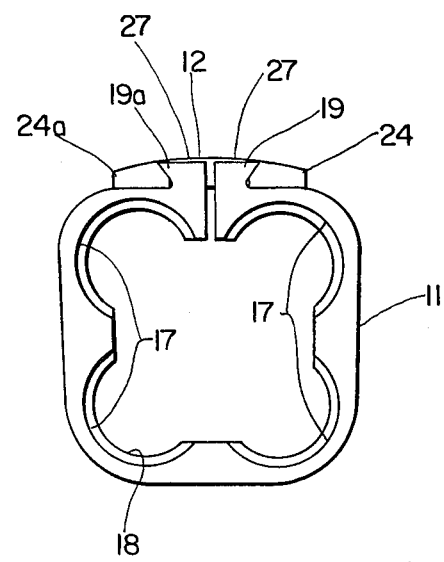
FIG. 2 is a front elevation view of the clamp of FIG. 1 secured around a number of cables.

In the present embodiment the band 11 is shaped to enclose four electrical cables of the type having a rubber or rubber-like outer insulating coating. The band is thus shaped in substantially a square and has ends 13 and 14 which are slightly spaced from each other to define a gap 15 therebetween. The position of the ends 13 and 14 and the hard but resilient material of the band enables the ends to be drawn together into a contacting relationship as shown in FIG. 2.

The outer surface 16 of the band is substantially smooth but the inner surface is formed with curved or arcuate portions 17 in order to closely accommodate four electrical cables. An annular ridge or rib 18 extends on the inner surfaces of the arcuate portions 17 so as to dig into the cables' outer surfaces and to prevent the pulling out of a cable from the clamp.

Each of the band ends 13 and 14 has a pair of spaced lateral flanges 19 and 20 thereon. The flanges are spaced in the axial direction of the clamp so as to define a gap or slot 21 therebetween. The flanges 20 and 20a are aligned as may be seen in FIG. 3.

Each of the flanges 19 and 20 is formed with a bevel or inclined undersurface 22.

The locking member 12 has a body portion 23 which has a width such that the body portion is seated closely within the aligned slots 21 and 21a as shown in FIG. 3. At each of the ends of the body portion 23 are T-shaped end portions 24 and 24a. The surfaces of the end portions directed to each other and indicated at 25 are inclined at an angle corresponding to the angle of the flange beveled surfaces 22 so that the end portions are seated snugly beneath the beveled flange surfaces when the clamp is secured as shown in FIG. 2.

The height or thickness of the body portion 23 of the locking member 12 is equal to the heights of the lateral flanges 19 and 20 so that the upper surface 26 of the locking member body portion is flush with the upper surfaces 27 of the flanges 19 and 20 when the locking member is secured in position as shown in FIG. 2. The upper surfaces of the end portions 23 and 24a are preferably smoothly curved downwardly as shown in FIG. 2 so as to provide a smooth continuous surface formed by the upper surface portions of the locking member and upper surfaces 27 of the flanges.

In order to secure the clamp 10 around a number of cables the cables are inserted into the clamp through the open gap or space 15 and the band ends 13 and 14 are then drawn together and secured in clamped position by the locking member 12. One end portion 24 is first positioned under a pair of lateral flanges 19 and 20 and when the band ends are drawn together the second end portion will be snapped under the other lateral flanges 19a and 20a into the position as shown in FIGS. 2 and 3.

The clamp according to the present invention can also be modified as illustrated in FIG. 4 wherein the band 11' has on the band ends 13' and 14' a pair of spaced flanges 30 and 31 each of which is provided with an out-turned lip portion 32. It is to be understood that as viewed in FIG. 4 only one pair of each pair of flanges can be shown but that immediately behind these illlustrated flanges are similar flanges.

The locking member for this modified flange is indicated at 33 in FIG. 4a and similarly comprises a body portion 34 but at each of the corners of the body portion is a laterally extending tab 35. These tabs 35 are inserted under the lip portions 32 in the manner as shown in FIG. 4 when the clamp is in its secured position. The body portion 34 similarly is seated in the aligned slots between the flanges 30 and 31 of the clamp.

It is to be noted that in FIG. 4 cables 30 which are enclosed within the clamp are of a smaller size so that the 4 cables are not secured tightly within the closed clamp. There is thus provided an inner liner 41 which functions as a sleeve or bushing and closely secures the cables 40 within the locked clamp. The lining 41 is preferably of an electrically insulating material such as rubber or a rubber-like material. The liner 41 may also be of the same material as the clamp itself.

As a further modification, the locking member 12 and the locking member 33 may be made in two pieces by being separated along the line 36 as indicated in FIG. 4a. The locking member 12 may be similarly separated.

In the locked or secured position, the clamp 10 has a space 15 between the band ends 13 and 14 which is sufficient to enable the band ends to be drawn closer together in order to release the end portion 25 or tabs 35 of the locking members from underneath the flanges. However, it should be noted that in most cases it would be unnecessary to unlock the clamp since as a general rule once the clamps have been secured around a number of electrical cables they generally remain in this position.

In FIG. 5 there is shown a further modification wherein the clamp 10" has a single lateral flange on each band end. Band end 13 is provided with a flange 50 and band end 14 provided with a flange 51. These flanges are positioned in the central portion of the band end as viewed in the axial direction of the band. These flanges are similar in shape to the flanges 19 and 20 of the band illustrated in FIG. 1. Each of the flanges 50 and 51 has a length in the axial direction of the band 16 which is about one half of the width of the band. As a result, spaces 52 and 53 are formed on the outer surface of the band adjoining flange 50. In a similar manner, spaces 54 and 55 are formed adjoining the ends of the flange 51. The flanges 50 and 51 are aligned from each other. As result, spaces 53 and 55 on the two band ends will be aligned and spaces 52 and 54 will also be aligned. Each of the flanges 50 and 51 is formed with a bevel or inclined undersurface corresponding to inclined undersurface 22 of the clamp in FIG. 1.

The locking member for the clamp of FIG. 5 is illustrated at 56 and comprises a body portion consisting of two spaced parallel body members 57 and 58 the ends of which are connected by transverse end members 59 and 60. The transverse ends 59 and 60 have substantially the same shapes as the T-shaped end portions 24 and 24a of FIG. 1. The surfaces of the end portions 59 and 60 directed toward each other are inclined at 61 at an angle corresponding to the angle of the bevel surfaces on the flanges 50 and 51 so that the transverse end portions are seated snugly beneath the bevel end surfaces when the clamp is secured. The central portion of the locking member 56 is thus formed with a rectangular opening 62 which is shaped to accomodate the flanges 50 and 51.

In other respects, the band 16 and locking member 60 of the FIG. 5 modification have the same structural configurations and relationships and function together in the same manner as the corresponding components of the clamp of FIG. 1.

Thus it can be seen that the present invention has disclosed a clamp which is particularly adapted for multiple electrical cables. The clamp is preferably made of a nonmetallic material and the locking structure of the clamp is such that it is simple in operation but provides a secure locking after the clamp has been locked in position. Further, the relationship between the locking member and the band is such that a firm locking state is obtained but the locking member closely and snugly fits to the band so as to provide a minimum of obstruction when a clamped bundle of cables is dragged along a surface.

It will be understood that this invention is susceptible to modifications to adapt it different usages and conditions and, accordingly, it is desired to comprehend such modifications within this invention as may fall within the scope of the appended claims.

What is claimed is:

1. A clamp for multiple electrical cables and the like comprising a band of hard but resilient material shaped to enclose a plurality of cables, and having ends spaced to define a gap therebetween sufficient to receive said electrical cables therethrough such that said ends are adapted to be drawn together, aligned lateral flange means on each of said band ends, the undersides of said flange means being beveled, the length of a said flange means being less than the width of said band in its axial direction so as to define at least one space on a band end adjoining a said lateral flange means, each band end having at least one said space thereon and the spaces on said band ends being aligned, and a locking member having a body portion seatable in said aligned spaces and having a transverse shaped portion at each end thereof with a beveled innerface to conform to said flange means bevels receivable under said flange means when said band ends are drawn together to secure said clamp around cables enclosed therein, said locking member body portion having such a length that when said locking member transverse portion innerfaces are disposed under said flange means undersides said gap is reduced to a distance substantially equal to the horizontal distance under a said beveled underside of said flange means.

2. A clamp as claimed in claim 1 and further comprising an annular ridge on the inner surface of the band having a configuration to dig into the outer surfaces of the cables to prevent pulling out of the cables from the clamp.

3. A clamp as claimed in claim 1 where the axial length of a said at least one space is about one-half the width of said band.

4. A clamp as claimed in claim 1 wherein each of said flange means comprises a pair of spaced lateral flanges on each said band end with a said at least one space being therebetween to define a slot and the slots on said band ends being aligned, said locking member transverse end portions each comprising a T-shaped portion.

5. A clamp as claimed in claim 1 wherein a said flange means comprises a single flange on the central portion of a band end and a space being defined adjoining each end of a said flange, the spaces on one band end being aligned with the spaces on the other band end, said locking member body portion comprising a pair of spaced parallel body members seatable in said aligned end spaces and said transverse portion at each end thereof being receivable under a said flange.

6. A clamp as claimed in claim 5 wherein the thickness of said locking member body portion is equal to the height of said flange means and the upper surfaces of said transverse portions are curved toward the surface of the clamp such that said locking member is seated flush within said flange means.

7. A clamp as claimed in claim 5 wherein the lengths of said transverse end portions are equal to the width of said band.

8. A clamp as claimed in claim 5 wherein said spaced parallel body members and said transverse end portions define a rectangle having a rectangular opening therein to receive said flanges.

* * * * *

UNITED STATES PATENT OFFICE
CERTIFICATE OF CORRECTION

PATENT NO. : 4 426 754
DATED : January 24, 1984
INVENTOR(S) : David W. Smith and Francis M. Gagnon It is certified that error appears in the above-identified patent and that said Letters Patent are hereby corrected as shown below:

Abstract of the Disclosure last line:   change "lamp" to - clamp - .

Signed and Sealed this

Twenty-fourth Day of April 1984

[SEAL]

Attest:

GERALD J. MOSSINGHOFF

Attesting Officer    Commissioner of Patents and Trademarks